United States Patent
Guarr et al.

(10) Patent No.: US 7,450,291 B2
(45) Date of Patent: Nov. 11, 2008

(54) MULTI-CELL ELECTROCHROMIC DEVICES

(75) Inventors: Thomas F. Guarr, Holland, MI (US); Frederick T. Bauer, Holland, MI (US); David A. Theiste, Byron Center, MI (US)

(73) Assignee: Gentex Corporation, Zeeland, MI (US)

( * ) Notice: Subject to any disclaimer, the term of this patent is extended or adjusted under 35 U.S.C. 154(b) by 0 days.

(21) Appl. No.: 11/825,948

(22) Filed: Jul. 10, 2007

(65) Prior Publication Data

US 2007/0258128 A1    Nov. 8, 2007

Related U.S. Application Data

(63) Continuation of application No. 11/343,278, filed on Jan. 30, 2006, now Pat. No. 7,256,924.

(60) Provisional application No. 60/648,142, filed on Jan. 28, 2005.

(51) Int. Cl.
   *G02F 1/15*    (2006.01)
   *G02F 1/153*   (2006.01)

(52) U.S. Cl. ...................... 359/265; 359/268

(58) Field of Classification Search .......... 359/265–275
   See application file for complete search history.

(56) References Cited

U.S. PATENT DOCUMENTS

| | | | |
|---|---|---|---|
| 2,632,045 A | 4/1953 | Sziklai | |
| 3,280,701 A | 10/1966 | Donnelly et al. | |
| 3,453,038 A | 7/1969 | Kissa et al. | |
| 4,135,790 A | 1/1979 | Takahashi et al. | |
| 4,294,518 A | 10/1981 | O'Connor et al. | |
| 4,436,378 A | 3/1984 | Kirkman | |
| 4,573,768 A | 3/1986 | Polak et al. | |
| 4,618,218 A | 10/1986 | Shaw et al. | |
| 4,787,717 A | 11/1988 | Heinz geb Belgardt et al. | |
| 4,902,108 A | 2/1990 | Byker | |
| 4,958,917 A | 9/1990 | Hashimoto et al. | |
| 4,960,323 A | 10/1990 | Demiryont | |
| 4,983,957 A | 1/1991 | Ishikawa et al. | |
| 5,076,673 A | 12/1991 | Lynam et al. | |
| 5,928,572 A | 7/1999 | Tonar et al. | |
| 5,940,201 A | 8/1999 | Ash et al. | |
| 6,064,509 A | 5/2000 | Tonar et al. | |
| 6,137,620 A | 10/2000 | Guarr et al. | |
| 6,188,505 B1 | 2/2001 | Lomprey et al. | |
| 6,783,099 B2 | 8/2004 | Rukavina et al. | |
| 6,842,276 B2 | 1/2005 | Poll et al. | |

*Primary Examiner*—William C Choi
(74) *Attorney, Agent, or Firm*—King & Partners, PLC

(57) ABSTRACT

A multi-cell electrochromic device comprising: first and second electrochromic device sub-assemblies which each comprise; a first substantially transparent substrate having an electrically conductive material associated therewith and second substrate having an electrically conductive material associated therewith; and an electrochromic medium contained within a chamber positioned between the first and second substrates, wherein the electrochromic medium comprises: at least one solvent; at least one anodic electroactive material; at least one cathodic electroactive material; wherein at least one of the anodic and cathodic electroactive materials is electrochromic; and wherein the first and second electrochromic device sub-assemblies are in optical alignment, and further wherein the multi-cell electrochromic device exhibits a transmittance of less than approximately 1.5% in a low transmission state.

20 Claims, 4 Drawing Sheets

MULTI-CELL ELECTROCHROMIC DEVICES

CROSS-REFERENCE TO RELATED APPLICATION(S)

This application is a continuation of U.S. application Ser. No. 11/343,278, filed Jan. 30, 2006 now U.S. Pat. No. 7,256,924, which claims the benefit of U.S. Provisional Application Ser. No. 60/648,142, filed Jan. 28, 2005, all of which are hereby incorporated herein by reference in their entirety, including all references cited therein.

BACKGROUND OF THE INVENTION

1. Field of the Invention

The present invention relates in general to electrochromic devices, and, more particularly, to a multi-cell electrochromic device having more than one electrochromic device sub-assembly configured in optical alignment.

2. Background Art

Electrochromic devices have been known in the art for several years. Furthermore, the utilization of two electrochromic devices in optical alignment has been disclosed in U.S. Pat. No. 5,076,673, entitled "Prolonged Coloration Electrochromic Assembly," which is hereby incorporated herein by reference in its entirety (hereinafter sometimes referred to as the '673 patent). However, to the best of Applicant's knowledge the '673 patent discloses electrochromic devices which are configured to color alternately, that is one electrochromic device colors while the second electrochromic device is cleared. The optically aligned devices are configured in such a way that light impacting the front surface of the device passes through both electrochromic media. While the above-identified patent teaches that a plurality of electrochromic devices, or device cells, can be configured to reduce color segregation in an electrochromic device that is intentionally colored for prolonged periods of time, the '673 patent is void of any adequate disclosure relative to the beneficial effects associated with simultaneously coloring and clearing a multi-cell electrochromic device having more than one electrochromic device sub-assembly.

By way of background, it will be understood that in a traditionally configured single compartment, solution phase, electrochromic device, which consists of two planar electrodes having an electrochromic medium contained between the two electrodes, the clearing time of the electrochromic device increases as the cell spacing or distance between the two planar electrodes increases. It will be further understood that, conversely, the current required to maintain a colored state with transmission below the highest transmission of the electrochromic device decreases as the cell spacing increases. For relatively small area electrochromic devices, such as automotive mirrors, the conductivity of transparent conductive coatings is sufficiently high to allow for the manufacture of commercially acceptable electrochromic devices—(i.e. the electrochromic devices color and clear (or cycle) in sufficiently short times because the cell spacing is relatively small, less than approximately 0.3 mm, while the electrochromic device uniformly colors and clears.

By way of contrast, however, in large area electrochromic devices, such as architectural windows or windows for transportation vehicles, if the same cell spacing is used the resistive losses associated with the conductive coatings can lead to a potential in the center of the large area electrochromic device that is less than the potential at the edge of the large area electrochromic device (e.g. near the electrical contact point) which can facilitate problematic, non-uniform coloration of such a large area electrochromic device.

One method used to overcome such a problem is to increase the cell spacing between the two traditional electrodes while, at the same time, decreasing the concentration of electrochromic materials in the medium. While such a solution leads to large area devices that color uniformly, the time required to clear the device can be quite long, which for some applications of electrochromic windows is problematic.

The concentration of electrochromic materials in the medium as is taught in U.S. Pat. No. 6,137,620, entitled "Electrochromic Media With Concentration-Enhanced Stability, Process For The Preparation Thereof And Use In Electrochromic Devices," which is hereby incorporated herein by reference in its entirety (hereinafter sometimes referred to as the '620 patent) also impacts the steady state current of a single compartment, solution phase, electrochromic device, as well as the ultimate coloration the device can achieve. In some applications the device has a desired low-end light transmission of less than approximately 0.5% requiring a larger concentration of electrochromic materials in the medium. Devices that are able to obtain these very dark low end transmission levels are also perceived as being quite slow to clear.

SUMMARY OF THE INVENTION

The present invention is directed to a multi-cell electrochromic device which comprises at least two electrochromic device sub-assemblies in optical alignment, such that both device sub-assemblies can be colored and cleared simultaneously leading to darker or deeper coloration and a faster clearing time than a single cell electrochromic device with essentially the same optical properties.

The present invention is also directed to a multi-cell electrochromic device comprising first and second transparent substrates with a defined space between the first and second substrate as well as additional substrates and defined spaces between each of the intermediate as well as the first and second substrates, wherein each of the defined spaces includes an electroactive and/or electrochromic medium.

The multi-cell devices of the present invention can be powered either in parallel or in a serial configuration, depending on the desired drive circuitry. These and other objectives of the present invention will become apparent in light of the present specification, claims, and drawings.

BRIEF DESCRIPTION OF THE DRAWINGS

The invention will now be described with reference to the drawings wherein.

DETAILED DESCRIPTION OF THE INVENTION

Figure 1:
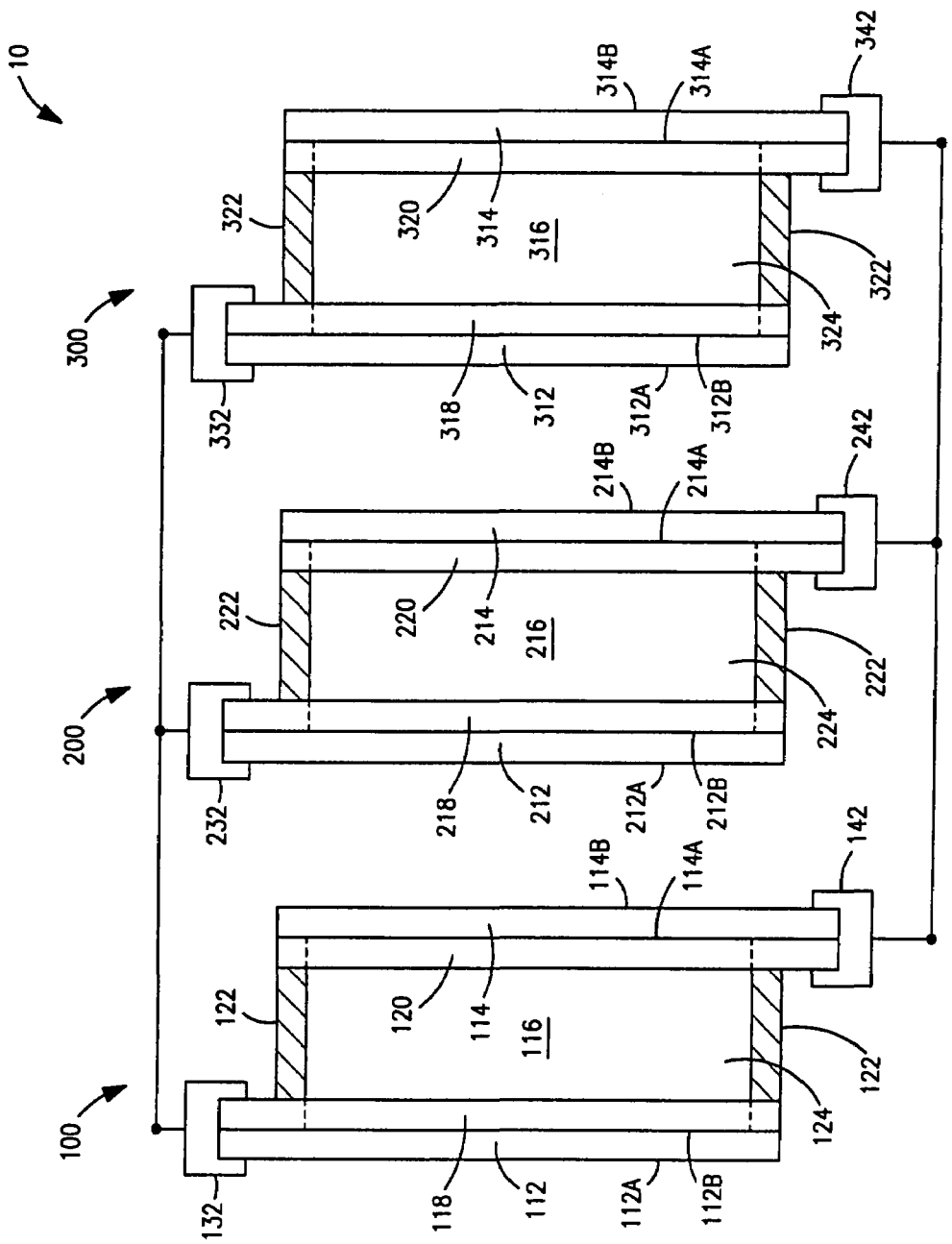
FIG. 1 of the drawings is a cross-sectional schematic representation of a multi-cell electrochromic device fabricated in accordance with the present invention in a parallel configuration.

Referring now to the drawings and to FIG. 1 in particular, a cross-sectional schematic representation of multi-cell electrochromic device 10 is shown, which generally comprises electrochromic device sub-assemblies 100, 200, and 300. Electrochromic device sub-assembly 100 generally comprises first substrate 112 having front surface 112A and rear surface 112B, second substrate 114 having front surface 114A and rear surface 114B, and chamber 116 for containing electrochromic medium 124. It will be understood that electrochromic device sub-assemblies 200 and 300, among others, comprise analogous members to those provided with respect to electrochromic device sub-assembly 100 and are numbered accordingly. For example, electrochromic medium 224 of electrochromic device sub-assembly 200 and electrochromic medium 324 of electrochromic device sub-assembly 300 are analogous to electrochromic medium 124 of electrochromic device sub-assembly 100. It will be further understood that any one of a number of electrochromic device sub-assemblies (e.g. 1-10) can be further associated with the structures shown and that the discussion of three electrochromic device sub-assemblies can be extended to multiple electrochromic layers. The multi-cell or stack of electrochromic devices may comprise, for illustrative purposes only, a mirror, an architectural window, an aircraft window or transparency, a display device, a contrast enhancement filter, and the like. It will be further understood that FIG. 1 is merely a schematic representation of multi-cell electrochromic device 10. As such, some of the components have been distorted from their actual scale for pictorial clarity.

Substrates 112, 212, and 312 may be fabricated from any one of a number of materials that are transparent or substantially transparent in the visible region of the electromagnetic spectrum, such as, for example, borosilicate glass, soda lime glass, float glass, natural and synthetic polymeric resins, plastics, and/or composites including Topas® which is commercially available from Ticona of Summit, N.J. While particular substrate materials have been disclosed, for illustrative purposes only, it will be understood that numerous other substrate materials are likewise contemplated for use—so long as the materials are at least substantially transparent and exhibit appropriate physical properties, such as strength, to be able to operate effectively in conditions of intended use. Indeed, electrochromic devices in accordance with the present invention can be, during normal operation, exposed to extreme temperature variation as well as substantial UV radiation, emanating primarily from the sun.

Substrates 114, 214, and 314 may be fabricated from similar materials as that of first substrate 112. However, if the electrochromic device is a mirror, then the requisite of substantial transparency is not necessary. As such, substrates 114, 214 and/or 314 may, alternatively, comprise polymers, metals, glass, and ceramics—to name a few. If the substrates are fabricated from sheets of glass, then the glass can optionally be tempered, heat strengthened, and/or chemically strengthened, prior to or subsequent to being coated with layers of electrically conductive material (118, 218, 318, 120, 220, and 320). For electrochromic device sub-assembly 100, one or more layers of electrically conductive material 118 are associated with rear surface 112B of first substrate 112. These layers serve as an electrode for the electrochromic device. Electrically conductive material 118 is desirably a material that: (a) is substantially transparent in the visible region of the electromagnetic spectrum; (b) bonds reasonably well to first substrate 112; (c) maintains this bond when associated with a sealing member; (d) is generally resistant to corrosion from materials contained within the electrochromic device or the atmosphere; and (e) exhibits minimal diffusion or specular reflectance as well as sufficient electrical conductance. It is contemplated that electrically conductive material 118 may be fabricated from fluorine doped tin oxide (FTO), for example TEC glass, which is commercially available from Libbey Owens-Ford-Co., of Toledo, Ohio, indium/tin oxide (ITO), doped zinc oxide or other materials known to those having ordinary skill in the art.

Substrates 112 and 114 of electrochromic device sub-assembly 100, as well as those relating to electrochromic device subassemblies 200 and 300, are preferably fabricated from a sheet of glass having a thickness ranging from approximately 0.5 millimeters (mm) to approximately 12.7 mm, and more preferably less than approximately 1 mm for certain low weight applications. Of course, the thickness of the substrate will depend largely upon the particular application of the multi-cell electrochromic device.

Additionally, the substrates of the present invention can be treated or coated as is described in U.S. Pat. No. 6,239,898, entitled "Electrochromic Structures," U.S. Pat. No. 6,193,378, entitled "Electrochromic Device Having A Self-Cleaning Hydrophilic Coating," and U.S. Pat. No. 6,816,297, entitled "Electrochromic Mirror Having A Self-Cleaning Hydrophilic Coating," the entire disclosures of which are hereby incorporated herein by reference in their entirety including the references cited therein. Other treatments, such as anti-reflectance coatings, hydrophilic coatings, low-E coatings, and UV-blocking layers are also contemplated for use in accordance with the present invention.

Electrically conductive material 120 is preferably associated with front surface 114A of second substrate 114, and is operatively bonded to electrically conductive material 118 by sealing member 122. As can be seen in FIG. 1, once bonded, sealing member 122 and the juxtaposed portions of electrically conductive materials 118 and 120 serve to define an inner peripheral geometry of chamber 116. Electrically conductive material 120 may vary depending upon the intended use of the electrochromic device. For example, if the electrochromic device is a mirror, then the material may comprise a transparent conductive coating similar to electrically conductive material 118 (in which case a reflector can be associated with rear surface 114B of second substrate 114). Alternatively, electrically conductive material 120 may comprise a layer of reflective material in accordance with the teachings of U.S. Pat. No. 5,818,625, entitled "Electrochromic Rearview Mirror Incorporating A Third Surface Metal Reflector" and U.S. Pat. No. 6,597,489, entitled "Electrode Design For Electrochromic Devices," all of which are hereby incorporated herein by reference in their entirety. In this case, electrically conductive material 120 is associated with front surface 114A of second substrate 114. Typical coatings for this type of reflector include chromium, ruthenium, rhodium, silver, silver alloys, combinations, and stacked layers thereof.

Sealing member 122 may comprise any material that is capable of being adhesively bonded to the electrically conductive materials 118 and 120 to, in turn, seal chamber 116 so that electrochromic medium 124 does not inadvertently leak out of the chamber. As is shown in dashed lines in FIG. 1, it is also contemplated that the sealing member extend all the way to rear surface 112B and front surface 114A of their respective substrates. In such an embodiment, the layers of electrically conductive material 118 and 120 may be partially removed where the sealing member 122 is positioned. If electrically conductive materials 118 and 120 are not associated with their respective substrates, then sealing member 122 preferably bonds well to glass. It will be understood that sealing member 122 can be fabricated from any one of a number of materials including, for example, those disclosed in U.S. Pat. No. 4,297,401, entitled "Liquid Crystal Display And Photopolymerizable Sealant Therefore," U.S. Pat. No. 4,418,102, entitled "Liquid Crystal Displays Having Improved Hermetic Seal," U.S. Pat. No. 4,695,490, entitled "Seal For Liquid Crystal Display," U.S. Pat. No. 5,596,023, entitled "Sealing Material For Liquid Crystal Display Panel, And Liquid Crystal Display Panel Using It," U.S. Pat. No. 5,596,024, entitled "Sealing Composition For Liquid Crystal," and U.S. Pat. No. 6,157,480, entitled "Seal For Electrochromic Devices," all of which are hereby incorporated herein by reference in their entirety.

Multi-cell electrochromic device 10 further includes means of providing electrical contact to the electrochromic medium, such as bus clips (132, 142, 232, 242, 332, and/or 342) that are associated with their respective layers of electrically conductive material (i.e. electrodes) as is disclosed in U.S. Pat. No. 6,407,847, entitled "Electrochromic Medium Having A Color Stability," which is hereby incorporated herein by reference in its entirety. By way of example, bus clips thus enable electrical current to flow between an external driving circuit through first and second electrodes 118 and 120 and electrochromic medium 124 contained in chamber 116 therebetween. In this manner, the light transmittance of electrochromic device sub-assembly 100 may be varied in response to the electrical control of an external drive circuit. It will be understood that bus clips may be made of any known construction and/or known materials. One possible construction for bus clips is disclosed in U.S. Pat. No. 6,064,509, entitled "Clip For Use With Transparent Conductive Electrodes In Electrochromic Devices" the disclosure of which is hereby incorporated herein by reference in its entirety. Additionally electrical contact may be provided by conventional conductive inks, metal foils, and the like, such as are used in electrochromic mirrors with a metallic ring that is visible around the perimeter of the mirror as is disclosed in U.S. Patent Application Ser. No. 60/614,150, entitled "Vehicular Rearview Mirror Elements and Assemblies Incorporating These Elements," which is hereby incorporated herein by reference in its entirety.

For purposes of the present disclosure, electrochromic medium 124 comprises at least one solvent, an anodic material, and a cathodic material, preferably associated with a cross-linked polymer matrix, a free-standing gel, and/or a substantially non-weeping gel as is disclosed in U.S. patent application Ser. No. [To Be Assigned] entitled "Electrochromic Medium Having A Self-Healing, Cross-Linked Polymer Matrix and Associated Electrochromic Device," U.S. Pat. No. 7,001,540, entitled "Electrochromic Medium Having A Self-Healing, Cross-Linked Polymer Gel and Associated Electrochromic Device," and U.S. Pat. No. 6,635,194, entitled "Electrochromic Medium Having A Self-Healing, Cross-Linked Polymer Gel and Associated Electrochromic Device," all of which are hereby incorporated herein by reference in their entirety including the references cited therein.

Typically both of the anodic and cathodic materials are electroactive and at least one of them is electrochromic. It will be understood that regardless of its ordinary meaning, the term "electroactive" will be defined herein as a material that undergoes a modification in its oxidation state upon exposure to a particular electrical potential difference. Furthermore, it will be understood that the term "electrochromic" will be defined herein, regardless of its ordinary meaning, as a material that exhibits a change in its extinction coefficient at one or more wavelengths upon exposure to a particular electrical potential difference.

Electrochromic medium 124 is preferably chosen from one of the following categories:

(1) Single-layer, single-phase—The electrochromic medium may comprise a single-layer of material which may include small non-homogenous regions and includes solution-phase devices where a material may be contained in solution in the ionically conducting electrolyte which remains in solution in the electrolyte when electrochemically oxidized or reduced. Solution phase electroactive materials may be contained in the continuous solution-phase of a gel medium in accordance with the teachings of U.S. Pat. No. 5,928,572, entitled "Electrochromic Layer And Devices Comprising Same," and International Patent Application Ser. No. PCT/US98/05570, entitled "Electrochromic Polymeric Solid Films, Manufacturing Electrochromic Devices Using Such Solid Films, And Processes For Making Such Solid Films And Devices," both of which are hereby incorporated herein by reference in their entirety.

More than one anodic and cathodic material can be combined to give a pre-selected color as described in U.S. Pat. No. 5,998,617, entitled "Electrochromic Compounds," U.S. Pat. No. 6,020,987, entitled "Electrochromic Medium Capable Of Producing A Pre-selected Color," U.S. Pat. No. 6,037,471, entitled "Electrochromic Compounds," and U.S. Pat. No. 6,141,137, entitled "Electrochromic Media For Producing A Preselected Color," all of which are hereby incorporated herein by reference in their entirety.

The anodic and cathodic materials may also be combined or linked by a bridging unit as described in U.S. Pat. No. 6,241,916, entitled "Electrochromic System" and/or United States Patent Publication No. 2002/00152214 A1, entitled "Electrochromic Device," which are hereby incorporated herein by reference in its entirety. The electrochromic materials may also include near infrared (NIR) absorbing compounds as described in U.S. Pat. No. 6,193,912, entitled "Near Infrared-Absorbing Electrochromic Compounds And Devices Comprising Same" which is also hereby incorporated herein by reference in its entirety.

It is also possible to link anodic materials or cathodic materials by similar methods. The concepts described in these patents can further be combined to yield a variety of electroactive materials that are linked or coupled, including linking of a redox buffer such as linking of a color-stabilizing moiety to an anodic and/or cathodic material.

The anodic and cathodic electrochromic materials can also include coupled materials as described in U.S. Pat. No. 6,249,369, entitled "Coupled Electrochromic Compounds With Photostable Oxidation States," which is hereby incorporated herein by reference in its entirety.

The concentration of the electrochromic materials can be selected as taught in U.S. Pat. No. 6,137,620, entitled "Electrochromic Media With Concentration Enhanced Stability, Process For The Preparation Thereof, and Use In Electrochromic Devices" the entirety of which is hereby incorporated herein by reference. Additionally, a single-layer, single-phase medium may include a medium where the anodic and cathodic materials are incorporated into a polymer matrix as is described in International Patent Application Ser. No. PCT/EP98/03862, entitled "Electrochromic Polymer System" which is hereby incorporated herein by reference in its entirety, and International Patent Application Ser. No. PCT/US98/05570, entitled "Electrochromic Polymeric Solid Films, Manufacturing Electrochromic Devices Using Such Solid Films, And Processes For Making Such Solid Films And Devices."

(2) Multi-layer—The medium may be made up in layers and includes a material attached directly to an electrically conducting electrode or confined in close proximity thereto which remains attached or confined when electrochemically oxidized or reduced.

(3) Multi-phase—One or more materials in the medium undergoes a change in phase during the operation of the device. For example, a material contained in solution in the ionically conducting electrolyte forms a layer on the electrically conducting electrode when electrochemically oxidized or reduced.

In addition, electrochromic medium 124 may comprise other materials, such as light absorbers, light stabilizers, thermal stabilizers, antioxidants, thickeners, viscosity modifiers, tint providing agents, redox buffers, electron shuttles, and mixtures thereof. Electron shuttles suitable for use in accordance with the present invention include those disclosed in, for example, U.S. Pat. No. 6,700,693 B2, entitled "Electrochromic Devices Having An Electron Shuttle," and redox buffers suitable for use in accordance with the present invention include those disclosed in, for example, U.S. Pat. No. 6,188,505 B1, entitled "Color-Stabilized Electrochromic Devices," which are hereby incorporated herein by reference in their entirety. Suitable UV-stabilizers may include: the material ethyl-2-cyano-3,3-diphenyl acrylate, sold by BASF of Parsippany, N.Y., under the trademark Uvinul N-35 and by Aceto Corp., of Flushing, N.Y., under the trademark Viosorb 910; the material (2-ethylhexyl)-2-cyano-3,3-diphenyl acrylate, sold by BASF under the trademark Uvinul N-539; the material 2-(2'-hydroxy-4'-methylphenyl)benzotriazole, sold by Ciba-Geigy Corp. under the trademark Tinuvin P; the material 3-[3-(2H-benzotriazole-2-yl)-5-(1,1-dimethylethyl)-4-hydroxyphenyl]propionic acid pentyl ester prepared from Tinuvin 213, sold by Ciba-Geigy Corp., via conventional hydrolysis followed by conventional esterification (hereinafter "Tinuvin PE"); the material 2,4-dihydroxybenzophenone sold by, among many others, Aldrich Chemical Co.; the material 2-hydroxy-4-methoxybenzophenone sold by American Cyanamid under the trademark Cyasorb UV 9; and the material 2-ethyl-2'-ethoxyalanilide sold by Sandoz Color & Chemicals under the trademark Sanduvor VSU—to name a few.

For purposes of the present invention, anodic materials may include any one of a number of materials including ferrocene, substituted ferrocenes, substituted ferrocenyl salts, substituted phenazines, phenothiazine, substituted phenothiazines, thianthrene, substituted thianthrenes. Examples of anodic materials may include di-tert-butyl-diethylferrocene, 5,10-dimethyl-5,10-dihydrophenazine, 3,7,10-trimethylpheno-thiazine, 2,3,7,8-tetramethoxythianthrene, and 10-methylphenothiazine. It is also contemplated that the anodic material may comprise a polymer film, such as polyaniline, polythiophenes, polymeric metallocenes, or a solid transition metal oxide, including, but not limited to, oxides of vanadium, nickel, iridium, as well as numerous heterocyclic compounds, etcetera. It will be understood that numerous other anodic materials are contemplated for use including those disclosed in U.S. Pat. No. 4,902,108, entitled "Single-Compartment, Self-Erasing, Solution-Phase Electrochromic Devices, Solutions For Use Therein, And Uses Thereof," as well as U.S. Pat. No. 6,188,505 B1, entitled "Color-Stabilized Electrochromic Devices," and U.S. Pat. No. 6,710,906, entitled "Controlled Diffusion Coefficient Electrochromic Materials For Use In Electrochromic Mediums And Associated Electrochromic Devices," all of which are hereby incorporated herein by reference in their entirety.

Cathodic materials may include, for example, viologens, such as methyl viologen tetrafluoroborate, octyl viologen tetrafluoroborate, or benzyl viologen tetrafluoroborate. It will be understood that the preparation and/or commercial availability for each of the above-identified cathodic materials is well known in the art. See, for example, "The Bipyridinium Herbicides" by L. A. Summers (Academic Press 1980). While specific cathodic materials have been provided for illustrative purposes only, numerous other conventional cathodic materials are likewise contemplated for use including, but by no means limited to, those disclosed in previously referenced and incorporated U.S. Pat. No. 4,902,108, and U.S. Pat. No. 6,710,906, entitled "Controlled Diffusion Coefficient Electrochromic Materials For Use In Electrochromic Mediums And Associated Electrochromic Devices." Moreover, it is contemplated that the cathodic material may comprise a polymer film, such as various substituted polythiophenes, polymeric viologens, an inorganic film, or a solid transition metal oxide, including, but not limited to, tungsten oxide.

For illustrative purposes only, the concentration of the anodic and cathodic materials can range from approximately 1 millimolar (mM) to approximately 500 mM and more preferably from approximately 2 mM to approximately 100 mM. While particular concentrations of the anodic as well as cathodic materials have been provided, it will be understood that the desired concentration may vary greatly depending upon the geometric configuration of the chamber containing electrochromic medium 124.

Electrochromic cells or device sub-assemblies 200 and 300 are constructed in an analogous manner to complete the final assembled device. It will be understood that electrochromic cells or device sub-assemblies 100, 200, and 300 can optionally be laminated together. In this embodiment of the invention devices are connected to an electrical power source in a parallel configuration such that the total applied potential is an appropriate potential to color one of the cells in the assembled device. It is further envisioned that the chambers can be filled with electrochromic media that are different from each other. Thus optical properties, such as color, and thermal properties, such as NIR attenuation, can be adjusted in a relatively straightforward manner.

Figure 2:
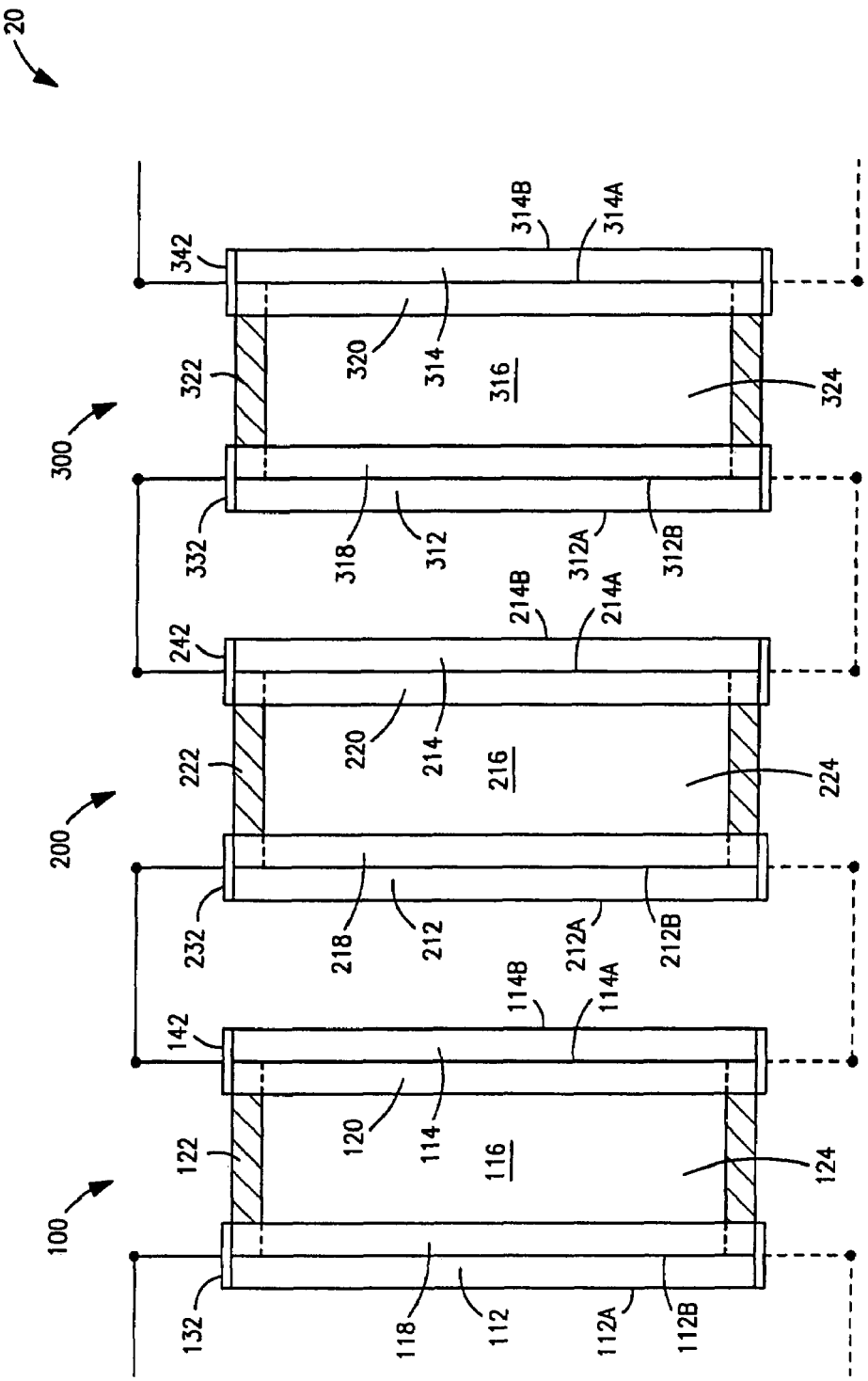
FIG. 2 of the drawings is a cross-sectional schematic representation of a multi-cell electrochromic device fabricated in accordance with the present invention in a serial configuration.

FIG. 2 depicts multi-cell electrochromic device 20 which comprises a series of device sub-assemblies 100, 200, and 300 as in FIG. 1, however, in this embodiment the devices are powered in series, thus if each of three cells reached its low end transmission level at a potential of 1.2 V a potential of 3.6 V (1.2V×3) would be applied. The conductive layers on the substrates between 112 and 314 (i.e. 118 to 320) can be connected in a variety of ways including metallic clips (e.g. 132, 142, 232, 242, 332, and 342) along the edges of the substrates or depositing a conductive layers such as a metal or conductive metal oxide along the edge.

Figure 3:
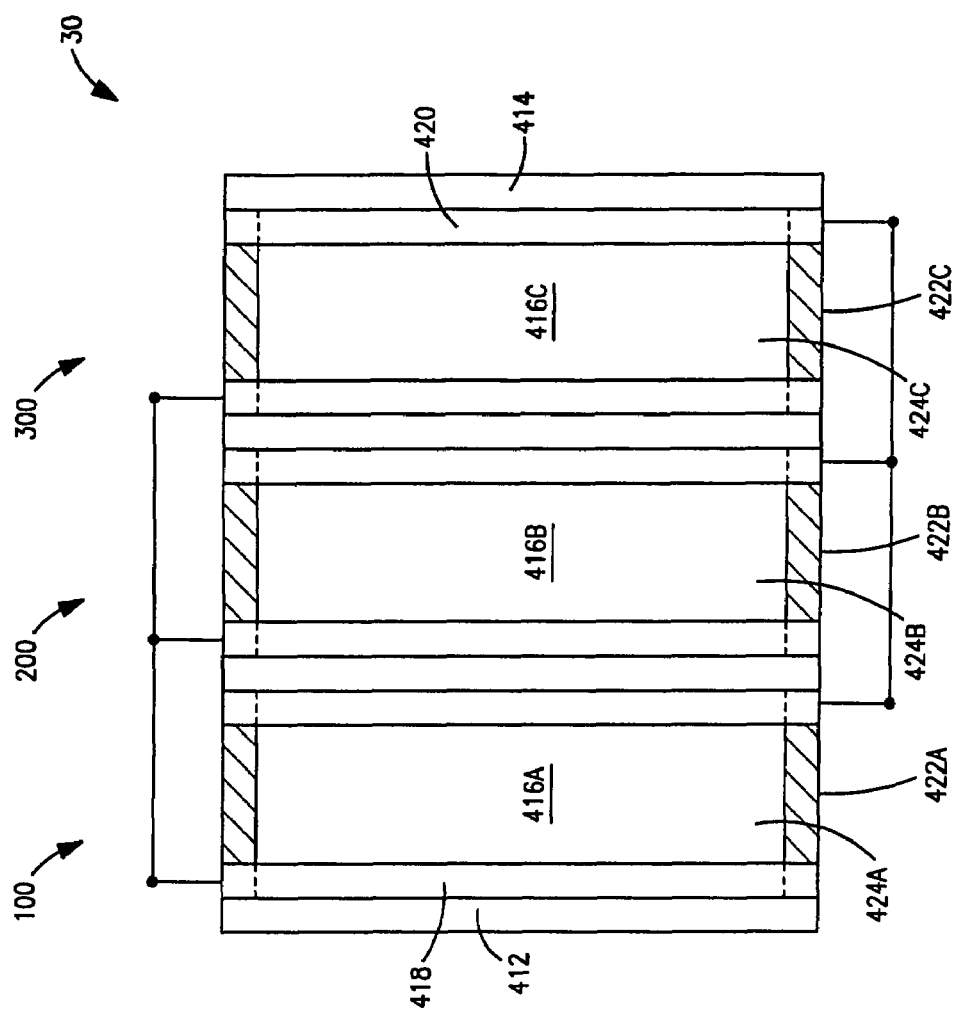
FIG. 3 of the drawings is a cross-sectional schematic representation of a multi-cell electrochromic device fabricated with the device cells or sub-assemblies in a parallel configuration in accordance with the present invention.

FIG. 3 depicts multi-cell electrochromic device 30 which comprises two substrates 412 and 414 with additional substrates between them. The additional substrates are coated on both surfaces with transparent conductive coatings, analogous to coating 118 in FIG. 1. As in FIG. 1, the media are powered in parallel thus the potential applied is the same as for a single cell.

Figure 4:
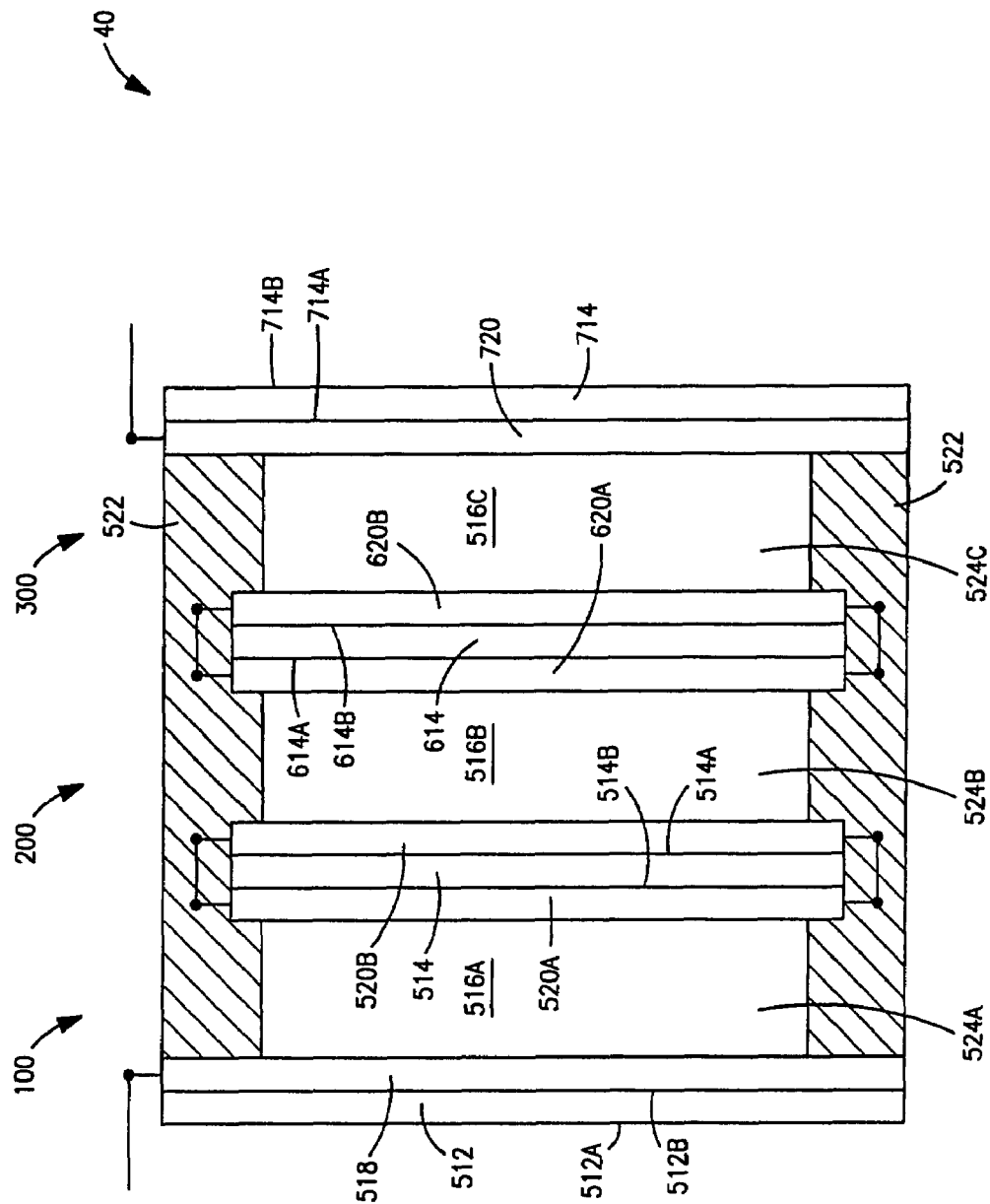
FIG. 4 of the drawings is a cross-sectional schematic representation of a multi-cell electrochromic device fabricated with the device cells or sub-assemblies in a serial configuration in accordance with the present invention.

FIG. 4 depicts multi-cell electrochromic device 40 which is similar to device 30 of FIG. 3, however, in this embodiment the media are powered in series, thus if each of three cells reaches its low end transmission level at a potential of 1.2 V, a potential of 3.6 V (1.2V×3) is applied. In this configuration the back-to-back conductive layers on the intermediate substrates can again be connected, as in FIG. 2 by metal clips or edge depositing a conductive metallic or metal oxide layer. The embodiment in FIG. 4 gives the additional ability to completely encapsulate to intermediate substrates in the perimeter seal as depicted, however discrete sealing may be done as is shown in FIG. 3.

It will be understood that multi-cell electrochromic devices fabricated in accordance with the present invention can exhibit a transmittance of less than approximately 1.5% in a low transmission state, more preferably less than approximately 1.0% in a low transmission state, and in certain applications a transmittance of less than approximately 0.5% in a low transmission state.

In addition, the multi-cell electrochromic devices of the present invention transition upon clearing from a lowest transmission state to approximately 1% transmission in a shorter period of time than a single-cell electrochromic device having essentially the same optical properties. Moreover, The multi-cell electrochromic devices of the present invention transition upon clearing from a lowest transmission state to approximately 2% transmission in a shorter period of time than a single-cell electrochromic device having essentially the same optical properties.

The invention in any of its embodiments enables one skilled in the art to produce a multi-cell electrochromic device that can clear in a shorter period of time than a single-cell electrochromic device with similar optical properties.

While the invention has been described in detail herein in accordance with certain preferred embodiments thereof, many modifications and changes therein may be effected by those skilled in the art. Accordingly, it is our intent to be limited only by the scope of the appending claims and not by way of details and instrumentalities describing the embodiments shown herein.

What is claimed is:

1. A multi-cell electrochromic device, comprising:
   a first substrate which comprises a first side and a second side, wherein the first and second sides include electrically conductive material associated therewith;
   a second substrate having an electrically conductive material associated therewith;
   a first electrochromic medium contained within a first chamber positioned between the first and second substrates, wherein the first electrochromic medium comprises:
      at least one solvent;
      at least one anodic electroactive material;
      at least one cathodic electroactive material; and
      wherein at least one of the anodic and cathodic electroactive materials is electrochromic;
   a third substrate having an electrically conductive material associated therewith;
   a second electrochromic medium contained within a second chamber positioned between the first and third substrates, wherein the second electrochromic medium comprises:
      at least one solvent;
      at least one anodic electroactive material;
      at least one cathodic electroactive material; and
      wherein at least one of the anodic and cathodic electroactive materials is electrochromic; and
   wherein the multi-cell electrochromic device exhibits a transmittance of less than approximately 1.5% in a low transmission state.

2. The multi-cell electrochromic device according to claim 1, wherein the multi-cell electrochromic device exhibits a transmittance of less than approximately 1.0% in a low transmission state.

3. The multi-cell electrochromic device according to claim 1, wherein the multi-cell electrochromic device exhibits a transmittance of less than approximately 0.5% in a low transmission state.

4. The multi-cell electrochromic device according to claim 1, wherein the multi-cell electrochromic device transitions upon clearing from a lowest transmission state to approximately 1% transmission in a shorter period of time than a single-cell electrochromic device having essentially the same optical properties.

5. The multi-cell electrochromic device according to claim 1, wherein the multi-cell electrochromic device transitions upon clearing from a lowest transmission state to approximately 2% transmission in a shorter period of time than a single-cell electrochromic device having essentially the same optical properties.

6. The multi-cell electrochromic device according to claim 1, wherein at least one of the multi-cell electrochromic device substrates comprises a thickness of less than approximately 1 millimeter.

7. The multi-cell electrochromic device according to claim 1, wherein each one of the multi-cell electrochromic device substrates comprises a thickness of less than approximately 1 millimeter.

8. The multi-cell electrochromic device according to claim 1, wherein the multi-cell electrochromic device comprises an electrochromic window.

9. The multi-cell electrochromic device according to claim 1, wherein a substrate is coated with a reflective material.

10. The multi-cell electrochromic device according to claim 9, wherein the reflective material is selected from the group comprising chromium, ruthenium, rhodium, silver, alloys and/or combinations of the same, and stacked layers thereof.

11. The multi-cell electrochromic device according to claim 10, wherein the multi-cell electrochromic device is an electrochromic mirror.

12. The multi-cell electrochromic device according to claim 1, wherein the multi-cell electrochromic device is an aircraft transparency.

13. The multi-cell electrochromic device according to claim 1, wherein the multi-cell electrochromic device comprises a metallic ring around the perimeter.

14. The multi-cell electrochromic device according to claim 1, wherein an electrochromic medium further comprises at least one of a cross-linked polymer matrix, a free-standing gel, and a substantially non-weeping gel.

15. The multi-cell electrochromic device according to claim 1, wherein at least one of the first and second electrochromic mediums further comprises at least one redox buffer.

16. A multi-cell electrochromic device comprising:
   a first substantially transparent substrate which comprises a first side and a second side, wherein the first and second sides include electrically conductive material associated therewith;
   a second substrate having an electrically conductive material associated therewith;
   a first electrochromic medium contained within a first chamber positioned between the first and second substrates, wherein the first electrochromic medium comprises:
      at least one solvent;
      at least one anodic electroactive material;
      at least one cathodic electroactive material; and
      wherein at least one of the anodic and cathodic electroactive materials is electrochromic;

a third substrate having an electrically conductive material associated therewith;

a second electrochromic medium contained within a second chamber positioned between the first and third substrates, wherein the second electrochromic medium comprises:

at least one solvent;

at least one anodic electroactive material;

at least one cathodic electroactive material; and wherein at least one of the anodic and cathodic electroactive materials is electrochromic; and wherein the multi-cell electrochromic device exhibits a transmittance of less than approximately 1.0% in a low transmission state, and further wherein the multi-cell electrochromic device transitions upon clearing from a lowest transmission state to approximately 1% transmission in a shorter period of time than a single-cell electrochromic device having essentially the same optical properties.

17. The multi-cell electrochromic device according to claim 16, wherein at least one of the multi-cell electrochromic device substrates comprises a thickness of less than approximately 1 millimeter.

18. The multi-cell electrochromic device according to claim 16, wherein each one of the multi-cell electrochromic device substrates comprises a thickness of less than approximately 1 millimeter.

19. The multi-cell electrochromic device according to claim 16, wherein an electrochromic medium further comprises at least one of a cross-linked polymer matrix, a free-standing gel, and a substantially non-weeping gel.

20. An aircraft transparency, comprising:

a first substrate, a second substrate, and a third substrate, wherein each one of the first substrate, the second substrate, and the third substrate comprises at least one electrically conductive material associated therewith;

a first electrochromic medium contained within a first chamber positioned between the first and second substrates, and a second electrochromic medium contained within a second chamber positioned between the first and third substrates, wherein the first and second electrochromic mediums comprise:

at least one solvent;

at least one anodic electroactive material;

at least one cathodic electroactive material; and wherein at least one of the anodic and cathodic electroactive materials is electrochromic; and wherein the multi-cell electrochromic device exhibits a transmittance of less than approximately 1.5% in a low transmission state.

* * * * *